United States Patent [19]

Tangler

[11] 4,046,336
[45] Sept. 6, 1977

[54] VORTEX DIFFUSION AND DISSIPATION
[75] Inventor: James L. Tangler, Fort Worth, Tex.
[73] Assignee: Textron, Inc., Providence, R.I.
[21] Appl. No.: 589,053
[22] Filed: June 23, 1975

Related U.S. Application Data

[63] Continuation-in-part of Ser. No. 577,024, May 13, 1975, abandoned.
[51] Int. Cl.$^2$ .............................................. B64C 3/26
[52] U.S. Cl. .................... 244/198; 244/200; 244/130
[58] Field of Search ............... 244/40 R, 35 R, 40 A, 244/41, 17.11, 130, 82, 45 R, 123; 416/228; 415/DIG. 1

[56] References Cited
U.S. PATENT DOCUMENTS

| | | | |
|---|---|---|---|
| 1,464,784 | 8/1923 | Tarbox | 244/82 |
| 1,520,830 | 12/1924 | Ljungstrom | 416/228 |
| 2,743,888 | 5/1956 | Lippisch | 244/130 |
| 3,270,988 | 9/1966 | Cone, Jr. | 244/35 R |
| 3,411,738 | 11/1968 | Sargent | 244/40 R |
| 3,592,559 | 7/1971 | Ward | 416/228 |
| 3,840,199 | 10/1974 | Tibbs | 244/40 R |

FOREIGN PATENT DOCUMENTS 818,188  8/1959  United Kingdom ................. 244/130

Primary Examiner—Trygve M. Blix
Assistant Examiner—Galen L. Barefoot
Attorney, Agent, or Firm—Richards, Harris & Medlock

[57]  ABSTRACT

Vortex diffusion means for an aircraft having lift structure rooted therein that extends outboard to a structure tip from which a discrete tip vortex develops when said tip is propelled through the air. A sub-wing extends from the tip of the lift structure. Preferably, the sub-wing has its leading edge or upper lead surface tangent to the upper lead surface of the lift structure and a span axis parallel to the span axis of the lift structure. The sub-wing's chord is sized to equally divide the bound vorticity shed at the tip of the lift structure so that twin discrete vortices are generated. One discrete vortex forms along the streamwise edge of the lift structure's tip and the other forms along the streamwise edge of the sub-wing's tip. The distance between the two vortices is in the range of from 25 to 50% of the local chord of the lift structure.

12 Claims, 10 Drawing Figures

VORTEX DIFFUSION AND DISSIPATION

This is a continuation-in-part of U.S. Pat. application Ser. No. 577,024, filed May 13, 1975 and entitled "Vortex Attenuation and Dissipation" (now abandoned).

This invention relates to the diffusion of a vortex generated at the tip of a structure forming an aircraft lifting surface, and more particularly to structure on the tip of such lifting surface causing the formation of twin vortices whose centers are spaced apart transverse to the direction of travel of the tip by an amount in the range of from one-half to one-fourth of the lifting structure's local chord length.

Noise requirements have become a major factor in the design of helicopters for both military and commercial applications. Military helicopters should be as quiet as possible in order to avoid early detection and hence be more likely to survive a combat mission. Strict noise regulations threaten the continuance of commercial helicopter operations over heavily populated areas.

The most objectionable of the noises produced by a helicopter is known as blade slap. The impulsive noise can occur during high speed flight due to the strong compressibility effects on the advancing blade. It can also occur as a rotor blade intersects its own wake during the partial power descent of a helicopter approaching a landing site.

Partial power descent blade slap occurs when a blade intersects one of its vortices in either the first or fourth quadrant of the rotor disk. The first quadrant blade/vortex intersection occurs around 85° azimuth and is almost perpendicular to the blade's span. This form of intersection will decrease the blade's angle of attack inboard of the vortex and increase it outboard, thus producing an impulsive load near the tip that results in the sharp noise called blade slap. Blade/vortex interaction can occur in two regions of the fourth quadrant. Intersections occur at around 280° and 300° azimuth. During the 280° azimuth intersection the vortex is at about a 45° angle from the blade's span while, during the 300° azimuth intersection, the blade is almost parallel to the vortex and the interaction envelopes a large percentage of the blade. Both fourth quadrant intersections result in a sharp increase in angle of attack as the blade approaches the vortex followed by a sharp decrease as the blade passes into the vortex induced downwash.

The operational regions in which blade slap occurs depends on the helicopter's airspeed and descent rate. The first quadrant slap is found at lower descent rates than that of the fourth quadrant slap. It is also more noticeable inside the helicopter and, because of its forward directivity, can be heard well ahead of the approaching helicopter. The fourth quadrant slap is believed to be directed more down and aft of the helicopter. The airspeed and descent range where blade slap is the most intense varies from one model helicopter to another, but generally it occurs between airspeed of 60 to 85 knots and descent rates from 0 to 600 feet per minute.

Various means of reducing blade slap have been investigated. The most common means that have received considerable attention are lower tip speeds, additional blades, and special tip shapes. Linear injection of air into the vortex at the blade tip has been proposed on the theory that the injection of an unstable aerodynamic mass flow into the vortex core would significantly increase the viscous dissipation of the vortex.

A tip known as the ogee tip has been designed in an attempt to eliminate a strong concentrated tip vortex formed on the upper surface of the blade when the airflow on the lower surface of the blade passes around the streamwise edge of the tip. The ogee tip uses a form of reverse sweep. The angular variation of the sweep is such that the flow coming from the tip's lower surface does not reattach itself along the upper surface and only a diffused tip vortex is formed. Model tests of this tip have yielded conflicting results.

The present invention pertains to the use of special tip shapes which reduce partial power descent blade slap by two steps: (1) equally dividing the discrete tip vortex into two weaker twin discrete vortices, and (2) by generating the twin vortices in close proximity so that they interact and diffuse each other.

In accordance with the invention on an aircraft lifting surface which extends from a root to a tip is provided with structure at the tip to cause the formation of twin vortices whose centers are spaced apart transverse to the direction of travel of the blade tip by an amount in the range of from one-half to one-quarter of the lifting surface's local chord length. In one embodiment, a sub-wing is provided at the blade's leading edge having an angle of incidence parallel to the geometric chord line. In a second embodiment, a blade has a tip which is split spanwise from the outboard end with the lead portion canted upward and the trailing portion canted downward.

In both embodiments, dimensional relations are of importance in assuring production of twin vortices in a space relationship such that they are quickly diffused. The span of the sub-wing is from about 0.50 to 0.25 the blade chord, depending upon the blade aspect ratio and the sub-wing chord is about 0.20 the blade chord. The vertical separation between tips of the split tip blade is the same as the span above noted in the subwing, i.e., 0.50 to 0.25 of the blade chord.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

FIG. 1 diagrammatically illustrates the creation of vortices from tips of helicopter blades;

Figure 1:
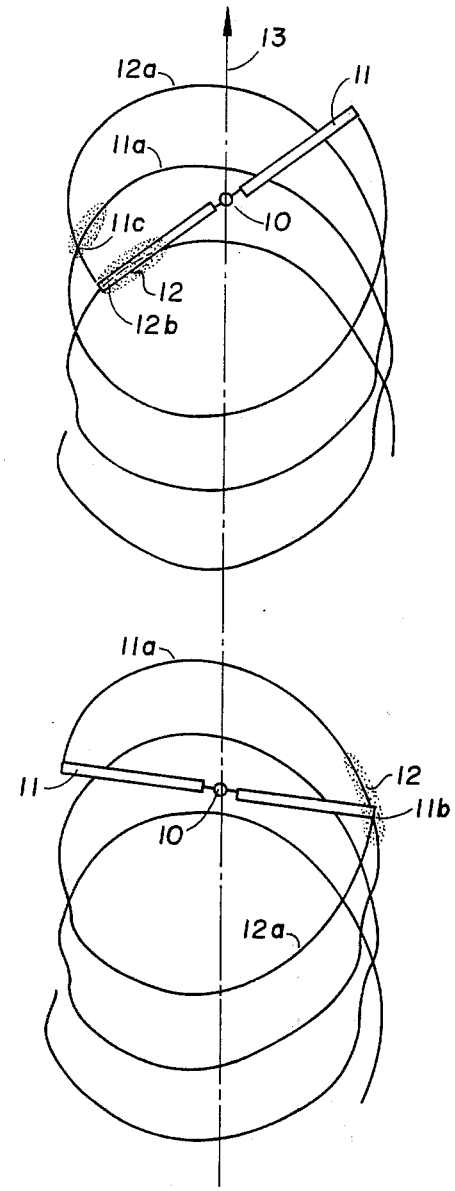

Referring now to FIG. 1, a helicopter rotor mounted on mast 10 comprises blades 11 and 12. As the helicopter moves forward in the direction of arrow 13, the tips of blade 11 and blade 12 leave a trailing vortex in their wake. The loci of the corresponding vortex trails are indicated by paths 11a and 12a. It will be noted that the tip of blade 12 passes over and thus intersects the vortex in path 11a at point 11b after about 90° of travel of blade 12 from the line with the fore/aft axis of the aircraft, i.e., in the first quarter. The impact of blade 12 on the vortex of path 11a causes an impulsive airload that is audible and is characteristic of many such aircraft. As above noted, the audible impulsive airload is generally termed blade slap.

It will also be noted that blade 12 intersects path 11a at point 11c after about 280° of travel from alignment of blade 11 with the fore/aft axis, i.e., in the fourth quarter. As above noted, this impulsive noise occurs during partial power descent due to the impulsive load resulting when the retreating blade intersects the vorex from blade 11 at point 11c. It also occurs as a rotor blade intersects its own tip votex during the partial power descent of the helicopter approaching a landing site. Thus, blade 12 intersects its own vortex at point 12b at approximately 300° azimuth.

Figure 2:
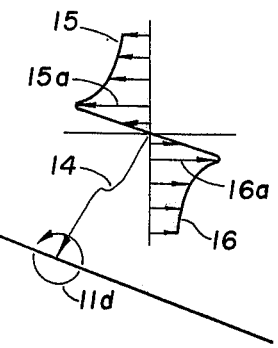
FIG. 2 illustrates a conventional standard tip helicopter blade and further illustrates a characteristic of the vortex from such blade.

In FIG. 2, a conventional square tip blade 11 has been illustrated in enlarged view with the wake 11a indicated as a spiral figuratively depicted by arrow 11d. The actual circumferential velocities, such as at the location indicated by arrow 14, are charted as to define a velocity profile 15 which describes the direction and magnitude of air flow in one-half of the vortex. The velocity profile 16 represents the direction and magnitude of air flow across the second half of the vortex. Both the ordinate and abscissa upon which curves 15 and 16 are drawn are oriented mutually perpendicular to the locus or vortex axis 11a. Thus, at any instant the peak flow, represented by the ordinate 15a on one side of the vortex, is opposite in direction and equal in magnitude to the flow on the opposite side as represented by the ordinate 16a.

The present invention is directed towards (1) a reduction in the magnitude of the vortex velocities, and (2) the early diffusion of the vortex.

Figure 3:
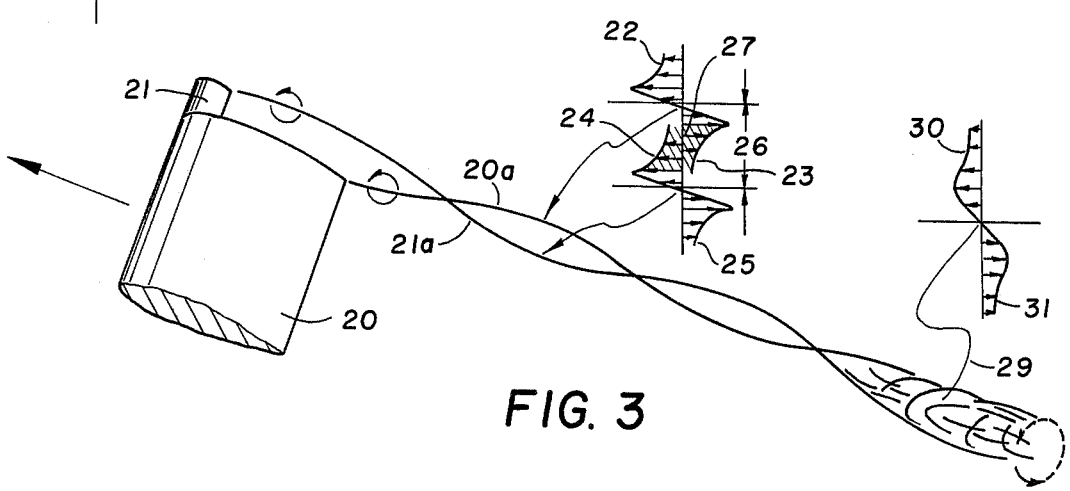
FIG. 3 illustrates a blade tip with a sub-wing embodying the present invention and further illustrates the characteristic of the vortices created thereby.

In accordance with one embodiment of the present invention, this is accomplished through a structure shown in FIG. 3 where a blade tip 20 is provided with a sub-wing 21. The sub-wing 21 will have a unique dimensional relationship as will be hereinafter defined. However, for the present purpose, it will be understood that a first vortex 20a is generated along the streamwise edge of the blade 20 as is characteristic of conventional blades generally. In accordance with the present invention, the sub-wing 21 is so dimensioned and located that a second vortex 21a is created along the streamwise edge of the sub-wing 21. The two vortices then interact as they leave the thus modified tip of the blade, become unstable, and break down to form a resulting diffused vortex before slap is produced.

By the use of the sub-wing 21, the strength of each of the two vortices is generally of a smaller magnitude than that experienced with the blade of FIG. 2. More particularly, the curves 22 and 23 portray the velocity profile across vortex 20a. The curves 24 and 25 portray the velocity profile across vortex 21a. It will be noted that with the blade illustrated in FIG. 2 modified by installation of the sub-wing 21 as in FIG. 3, the maximum velocities in resulting diffused vortex are substantially smaller than those represented by the ordinates 15a and 16a, FIG. 2. Furthermore, and most important, the distance 26 between the axes of the vortices 20a and 21a is so selected that the edges of the vortices overlap and thus cause diffusion of both vortices early in their existence. Such overlap occurs in the shaded region 27. The data thus represented are characteristic of the conditions found early in the existence of the vortex such as the location represented by the arrow 28. Later in time, as represented by the location of arrow 29, curves 30 and 31 represent the velocity profile across the wake indicating generally much lower velocities over a larger vortex core area.

The sub-wing 21 does not entail major design problems and may be inexpensively installed on existing helicopters.

In order to generate twin vortices of about equal strength and character, the location of the sub-wing on the streamwise edge of the tip and proper size and angle of incidence are important. It was determined that the best chordwise location for the sub-wing was as close to the blade's leading edge as possible. When the sub-wing is mounted a significant distance behind the leading edge of the blade, the sub-wing blocks the flow around the edge of the tip from the lower to upper surface. Because of this, an inboard concentrated discrete vortex similar to that departing the sub-wing is not formed along the blade/sub-wing junction. Only diffused vorticity, indicative of a high drag region, departs this junction. With the sub-wing mounted high on the tip airfoil profile, there is less blockage of the flow around the blade/sub-wing junction. Because of the contradictory requirements to locate the sub-wing as far forward and as high on the tip airfoil profile as possible, these conditions are slightly compromised. The best location is slightly behind the leading edge and just above the camber line of the tip airfoil profile.

With the optimum location of the sub-wing established, it is necessary to size the sub-wing to shed a vortex equal to that departing the blade/sub-wing junction. For this purpose the sub-wing's chord was used as the primary parameter to adjust the relative strength of the two vortices. It has been observed that when the sub-wing chord is approximately 20% of the main blade chord, the two vortices are of about the same strength. This is at low to medium angles of attack which is the range within which the tip operates as it generates those segments of the tip vortex that contribute to blade slap during partial power descent.

It might be thought that a much larger sub-wing chord is needed to generate a vortex equal to that departing the blade/sub-wing junction. However, about 50% of the vorticity in the blade's chordwise vorticity distribution is concentrated forward of the quarter chord. Since this concentration of vorticity cannot easily depart the blade platform at the blade/sub-wing junction, part of the vorticity transfers over to the sub-wing. This transfer of circulation results in a relatively strong vortex being generated by a sub-wing with a small chord.

Although the sub-wing's span also affects the vortex strength, its length is chosen based primarily on the separation distance required for the two vortices to undergo a destructive interaction before the following passage. The sub-wing's span is of a length such that the twin vortices stay separated as long as possible but yet break down and combine into one diffused vortex before the following blade passage. This condition produces the highest degree of diffusion in the resultant vortex before it intersects the following blade. The most desirable sub-wing span was found to be about 40% of the main blade chord. This separtion distance between vortices allowed the two vortices to combine into one diffused vortex about 30 chord lengths downstream of the generation blade. Most medium to high aspect ratio ($R=14$), two-bladed rotors have 30 to 40 chord lengths along an arc distance between blades. This arc length is sufficient for substantial diffusion to occur before the following blade encounter. Low aspect ratio ($R=7$), two-bladed rotors only have about 20 to 28 chord lengths along an arc between blades. Consequently, the sub-wing's span would have to be a small percentage of the blade chord in order for the two vortices to combine into one before the following blade passage. Because of this, the degree of diffusion in the resultant vortex for low aspect ratio blades would be less.

Figure 4:
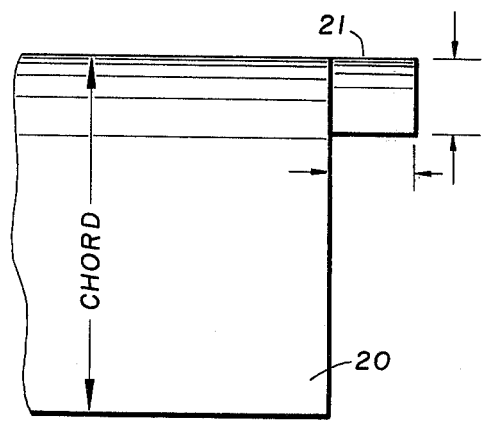
FIG. 4 is a top view of the tip of the blade of FIG. 3.

FIG. 4 is a top view of the blade tip of FIG. 3 embodying the present invention. The sub-wing 21 is relatively short both as to span and chord compared with the chord of the blade 20. It has been found that the span of the sub-wing preferably is of the order of from 50% to 25% the chord of the blade 20. As above noted, the optimum span of the sub-wing 21 will depend upon the aspect ratio of the blade 20.

Figure 5:
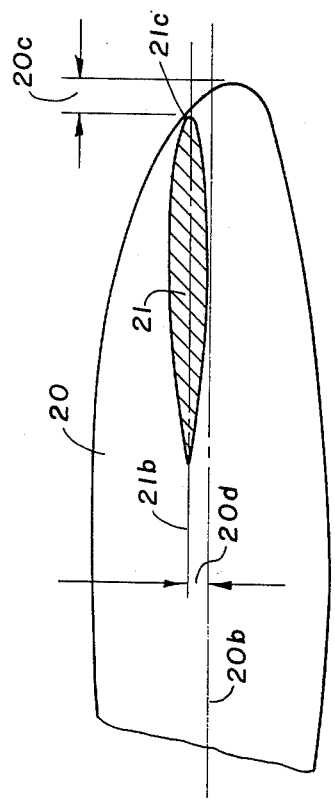
FIG. 5 is an end view of a portion of the blade of FIG. 3.

The location of the sub-wing 21 is illustrated in FIG. 5 where a portion of the main blade 20 has been illustrated with the chord line 20b extending the width of the blade. The sub-wing 21 is positioned with the upper leading edge tangent the upper leading edge of blade 20 at point 21c with the chord 21b parallel to chord 20b and spaced slightly above chord 20b. In the example illustrated in FIG. 5 where the chord of blade 20 is of the order of 24 inches, the distance 20c preferably will be from 0.235 inch to 0.245 inch. The spacing 20d between chords 20b and 21b preferably will be 0.140 inch to 0.15 inch.

Figure 7:
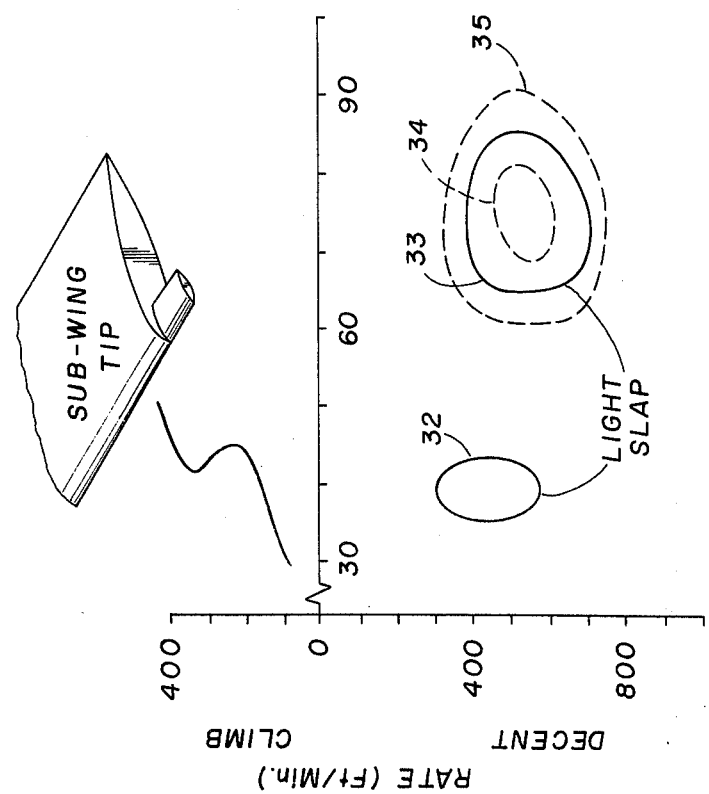
FIG. 7 is a similar plot illustrating the operation of the blade of FIG. 3.
Figure 6:
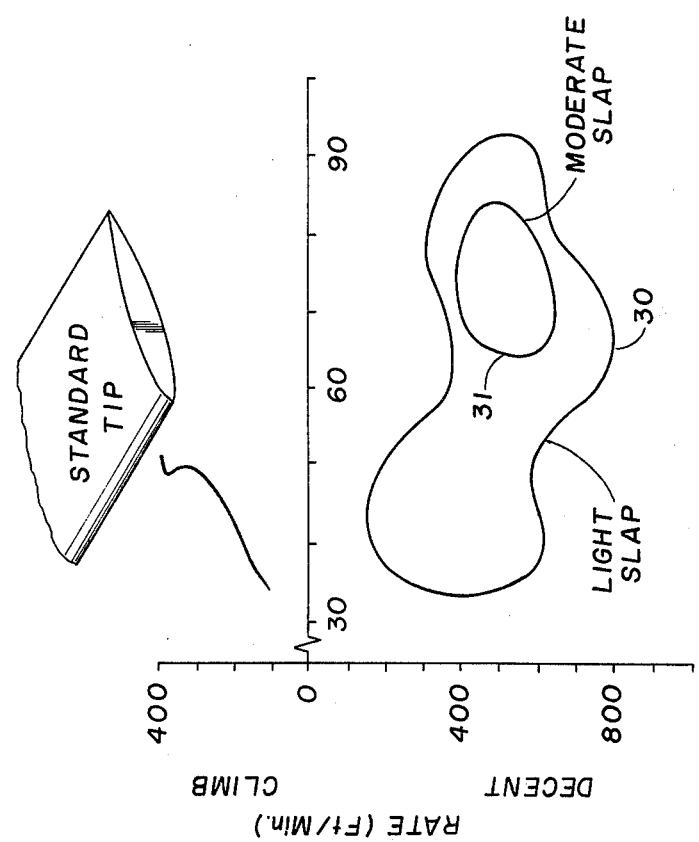
FIG. 6 is a plot of the intensity of slaps produced with the standard blade of FIG. 2.

In FIGS. 6 and 7, the effect of use of the present invention has been further graphically portrayed. The airspeed of the aircraft in knots is plotted as the abscissa and the ordinates are plotted in terms of rate of descent (R/D) and rate of climb (R/C) in feet per minute.

In FIG. 6 curve 32a encloses the area on the plot within which a light slap is produced in operation of a conventional or standard blade tip. The curve 32b represents the area on the plot in which a moderate or more intense slap is produced. It will be noted that the more intense slap area occurs at airspeeds of from about 63 to 86 knots and at rates of descent of the order of 400 to 650 ft/min. Utilizing the present invention, as shown in FIG. 7, no moderate slap areas are evident. Light slaps are encountered in the areas enclosed by curves 32c and 32d. Elimination of moderate slap is due to the fact that the vortex has been diffused generally as indicated by absence from FIG. 7 of the curves 32a and 32b of FIG. 3 indicative of diffusion of the vortex in question before the blade encounters it.

It has been found that if the angle of incidence with respect to geometric chord line of the sub-wing 21 is either positive or negative by only a few degrees (IR, ±2°), there will be relatively small zones of moderate slap from the system. As depicted in FIG. 7, curve 34 may be taken as indicative of the results produced where a positive or negative incidence angle is present in the blade of FIG. 3. The zone inside the curve 34 would represent a zone outside of curve 34 and of moderate or intense slap. The zone inside the curve 35 would be representative of the region of light slap, being slightly greater than that represented by curve 33.

However, the region of light slap is much smaller for either positive or negative incidence angle utilizing a system involving the sub-wing than for the standard tip as represented by curve 32a of FIG. 6. Thus, in accordance with the present invention, an incidence angle of 0° will be preferred although slight deviations therefrom still provide significant improvement in performance over that represented by the standard or conventional blade tips.

Figure 8:
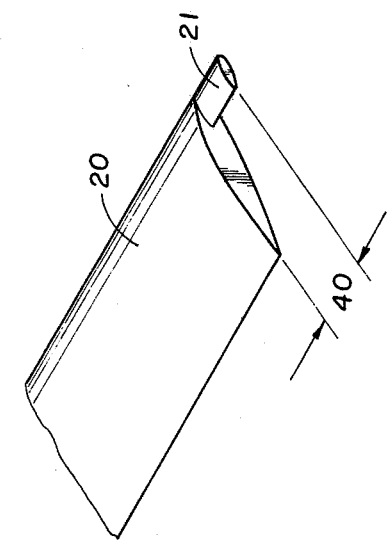
FIG. 8 is a different view of the blade of FIG. 3.

Referring now to FIG. 8, the blade 20 with sub-wing 21 has been shown in a different isometric view. As above explained, the span 40 of the sub-wing 21 will be selected depending upon the aspect ratio of blade 20. Heretofore, it has been considered that in order to produce two vortices, such as 20a and 21a of FIG. 3, of substantially equal magnitude, it was necessary to have a much larger stub blade than is illustrated herein. For example, heretofore an attempt has been made to dissipate vortices by utilizing a sub-wing where the chord of the sub-wing was 50% of the chord of the blade 20 and where the length of the sub-wing was equal to the chord of blade 20. Such system does not produce the results characteristic of the present invention. This is because it has been found or recognized that about 50% of the lift created by blade 20 is actually produced forward of the lead 25% of the chord. Thus, the sub-wing 21 may be relatively short as to chord length and still produce a vortex of strength equal to the vortex trailing the tip of the blade 20. With this understanding, the span 40 of the sub-wing will be selected such that the two vortices will interact one with another at a point such that the direction of flow of one vortex is opposite the direction of flow of the other vortex.

Figure 9:
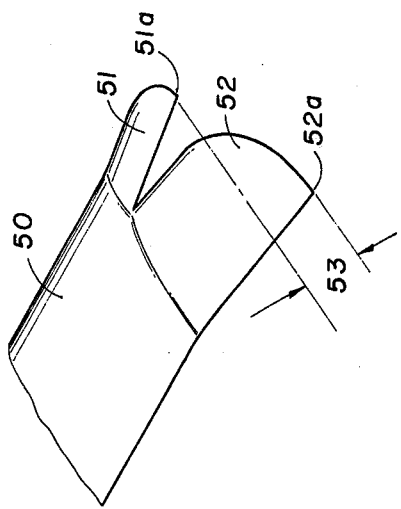
FIG. 9 illustrates a split tip embodiment of the invention.

The same beneficial results as above described utilizing a sub-wing as shown in FIG. 8 may be achieved by using a different blade tip construction. A second embodiment of the invention is illustrated in FIG. 9. FIG. 9 illustrates a split tip blade characterized by a leading edge portion forming a relatively short terminal blade 51 and trailing terminal blade 52. Blade 51 is upswept and has a chord which may be of the same order of magnitude as the chord of the sub-wing of FIG. 8. Blade 52 is downswept. The spans of blades 51 and 52 and the angles at which blades 51 and 52 deviate from the span axis of blade 50 are so selected that the spacing 53 is of the same character as the spacing 40 of FIG. 8. That is, the spacing is so selected that there will be the interaction between the adjacent vortices from the tip 51a and from tip 52a that the same interaction and diffusion as represented by the curves shown in FIG. 3 will be produced. The chords of the blades 51 and 52 are selected such that the intensity of the two vortices will be equal. Thus, the leading edge blade 51 is of smaller chord than the trailing blade 52.

Figure 10:
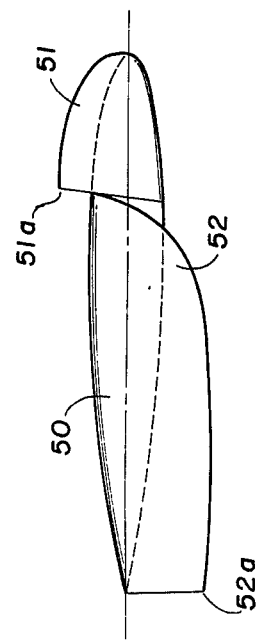
FIG. 10 is an end view of the blade of FIG. 9.

FIG. 10 illustrates blade 50 viewed from the outer end. It illustrates blade 51 slightly upswept with the lower surface thereof blending smoothly into the lower surface of the blade 51. Blade 52 is swept downward from blade 50 with the upper surface thereof blending smoothly into the upper surface of blade 50. Tips 51a and 52a of blades 51 and 52, respectively, are vertically spaced one from another. If the spans of blades 51 and 52 are equal, then tips 51a and 52a would lie in a plane normal to the span axis of blade 50. However, in FIG. 9 the span of blade 51 is less than the span of blade 52 so that the tips 51a and 52a are not in a plane normal to the span axis of blade 50. The critical point to the construction of the split blade tip of FIG. 9 is that the two vortices streaming from tips 51a and 52a are of equal intensity and that the spacing 53 be such that the perimeters of the vortices interact as explained in connected with FIG. 3. The distance 52 preferably is of the order of from 50% to 25% of the chord of blade 50, the precise length being dependent upon the aspect ratio of blade 50 as discussed in connection with FIG. 4.

While the foregoing description has dealt with the diffusion of the vortex produced at the outboard end of a helicopter blade and the diffusion of the vortex so as to avoid blade slap from helicopters, it will be understood that the invention is useful and is applicable to aircraft other than helicopters. For example, in high speed jet aircraft, turbulence in the wake thereof is similarly in the form of vortices which extend from the outboard wing tip. It is known that the turbulence is a potential source of danger to light aircraft crossing the path of a jet before the vortices have dissipated their energy. A useful provision on jet aircraft is a sub-wing or a split tip wing as to produce two vortices of substantially equal energy and spaced as to cause interaction resulting in dissipation. Therefore, the invention is not limited to helicopters, but rather is more generally applicable to structures forming aircraft lifting surfaces where the speed thereof through the atmosphere is such as to cause high energy vortices.

Having described the invention in connection with certain specific embodiments thereof, it is to be understood that further modifications may now suggest themselves to those skilled in the art and it is intended to cover such modifications as fall within the scope of the appended claims.

What is claimed is:

1. A blade construction for delayed diffusion of a vortex formed from airflow streaming from a blade tip which comprises:
   a. structure forming an aircraft lifting surface extending from a root to a tip, and
   b. a single structure rigidly fixed on said tip with a discrete streamwise boundary therebetween and an absolute angle of attack of said structure about equal to the absolute angle of attack of said blade for dividing said vortex into twin vortices whose centers are spaced apart transverse to the direction of travel of said blade tip by a distance in the range of from about one-half to one-quarter of the blade chord.

2. In an aircraft having lift structure rooted therein and extending outboard to a structure tip from which a first vortex extends when said tip is propelled through the air, diffusion means comprising:
   a sub-wing rigidly fixed to extend from said lift structure and having a discrete streamwise junction with said lift structure, with the absolute angle of attack of the sub-wing about equal to the absolute angle of attack of said lift structure and said sub-wing having a second vortex generating tip located to establish the axis of a second vortex twin to said first vortex spaced spanwise from the axis of said first vortex a distance in the range of from about 50 to about 25% of the chord of said lift structure.

3. The combination set forth in claim 2 in which said sub-wing has an upper lead surface tangent to the upper lead surface of said lift structure.

4. The combination set forth in claim 3 in which the span axis of said sub-wing is parallel the span axis of said lift structure.

5. The combination set forth in claim 3 in which a second sub-wing trails said first sub-wing to produce said first vortex from the trailing tip thereof.

6. The combination set forth in claim 4 in which said sub-wing has zero dihedral.

7. In an aircraft having lift structure rooted therein and extending outboard, diffusion means comprising:
   a first sub-wing extending from said lift structure and having a first vortex generating tip which establishes the axis of a first vortex,
   a second sub-wing trailing said first sub-wing to produce a second vortex from the trailing tip thereof, said second sub-wing having the span axis thereof canted downward relative to the span axis of said lift structure and of length to form a vortex twin to said first vortex whose axis is spaced from the axis of said first vortex a distance in the range of from about 50 to 25% of the chord of said lift structure.

8. In an aircraft having lift structure rooted therein and extending outboard to a discrete structure tip from which a first vortex extends when said tip is propelled through the air, diffusion means comprising:
   a sub-wing extending from said lift structure and having a second vortex generating tip located to establish the axis of said second vortex spaced from the axis of said first vortex a distance in the range of from about 50 to about 25% of the chord of said lift structure in the tip region and wherein the span axis of said sub-wing is canted upwardly relative to the span axis of said lift structure.

9. A blade construction for diffusion of a vortex formed from airflow streaming from a blade tip which comprises:
   a. structure forming an aircraft lifting surfaces extending from a root to a tip, and
   b. structure rigidly fixed on said tip with the absolute angle of attack of the structure equal to the absolute angle of attack of the blade for causing the formation of twin vortices, said structure comprising a sub-wing chord length of about 20% the chord length of said blade in the region of said tip and extending spanwise from said blade tip near the leading edge thereof a distance not less than about 25% and not greater than about 50% of the chord of said blade to form a first vortex streaming from the tip of said sub-wing and said sub-wing being discretely jointed to said blade to leave the remainder of the blade tip free and unimpeded at the blade tip for streamwise flow of air at the edge of the tip from the lower to upper surface thereof for establishing a second vortex.

10. The combination set forth in claim 9 in which the absolute angle of attack of said sub-wing is less than about 2° from the angle of attack of said blade.

11. A blade construction for diffusion of a vortex formed from airflow streaming from a blade tip which comprises:
   a. structure forming an aircraft lifting surface extending from a root to a tip; and
   b. structure on said tip for causing the formation of twin vortices, said structure comprising a sub-wing having chord length of about 20% the chord length of said blade in the region of said tip and extending spanwise from said blade tip near the leading edge thereof a distance not less than about 25 and not more than about 50% of the chord of said blade to form a first vortex streaming from the tip of said sub-wing and said sub-wing being discretely and rigidly joined to said blade to leave the remainder of the blade tip free and unimpeded at the blade tip for streamwise flow of air at the edge of the tip from the lower to upper surface thereof for establishing a second vortex, the leading edge of said sub-wing being slightly behind the leading edge of said blade and the camber line of said sub-wing is slightly above the camber line of said blade.

12. An aircraft lifting structure which comprises:
a main blade structure adapted to be secured in lifting relation to an airframe at the root thereof and having a vortex forming tip, and
a single sub-wing structure rigidly fixed from said tip with the absolute angle of attack of the sub-wing structure equal to the absolute angle of attack of the main blade with a discrete streamwise junction with the tip of said blade structure for dividing said vortex into two vortices of about same strength separated spanwise by a distance greater than about one-quarter of the blade chord but not greater than about one-half of the blade chord in the tip region.

* * * * *